No. 872,309. PATENTED NOV. 26, 1907.
S. C. SCHOFIELD.
DOOR AND CUPBOARD CATCH.
APPLICATION FILED DEC. 21, 1906.
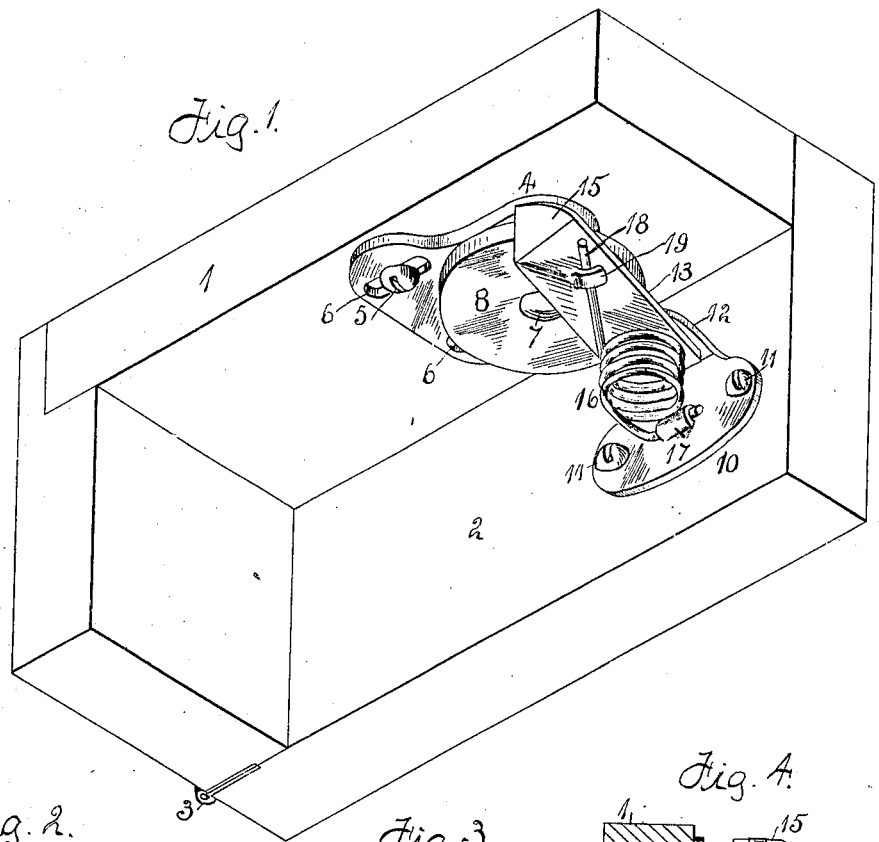
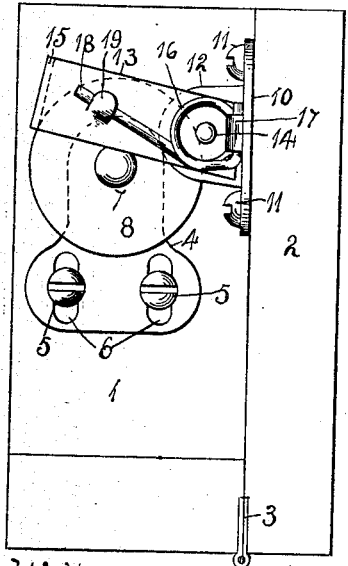
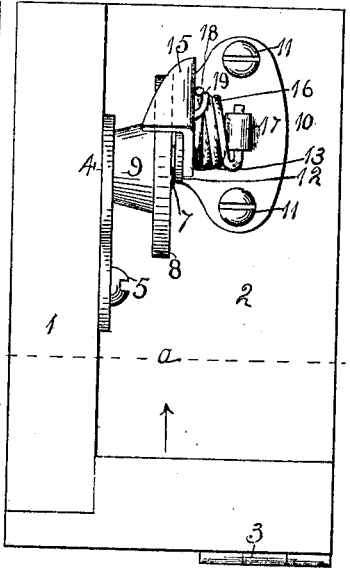
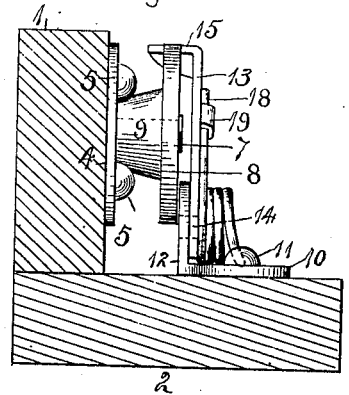
Witnesses:
E. Behel.
J. B. Clark
Inventor:
Silas C. Schofield
By A. O. Behel
Attorney

UNITED STATES PATENT OFFICE.

SILAS C. SCHOFIELD, OF FREEPORT, ILLINOIS, ASSIGNOR TO WILLIAM PETERSEN, OF LYONS, IOWA.

DOOR AND CUPBOARD CATCH.

No. 872,309.          Specification of Letters Patent.          Patented Nov. 26, 1907.

Application filed December 21, 1906. Serial No. 348,940.

To all whom it may concern:

Be it known that I, SILAS C. SCHOFIELD, a citizen of the United States, residing at Freeport, in the county of Stephenson and State of Illinois, have invented certain new and useful Improvements in Door and Cupboard Catches, of which the following is a specification.

The object of this invention is to construct a catch for use in connection with doors, cupboards and other similar uses.

In the accompanying drawings. Figure 1 is an isometrical representation of my improved catch in connection with a section of frame to which is hinged a section of door. Fig. 2 is a face view of the catch. Fig. 3 is an edge view. Fig. 4 is an end view.

My improved catch is shown in connection with a section of a door frame 1 and a section of a door 2 connected together by the hinges 3. To the door frame is connected a plate 4 by the screws 5 passing through slots 6 in the plate. From this plate extends a stud 7. A wheel 8 has a hub 9 and an opening is formed through the wheel and hub. This wheel 8 is placed over the stud 7 and the end of the stud riveted, which will prevent the displacement of the wheel, but permit it to turn freely on the stud.

To the door section 2 is secured a plate 10 by the screws 11. This plate has an upturned edge 12. To the upturned edge 12 of the plate 10 is pivoted a lever 13 at the point 14 and an end section 15 turned at right angles to its length. A coiled spring 16 has one end inserted beneath the loop 17 formed of the plate 10, and its other end 18 engages a projection 19 formed from the lever 13. The end of the lever near the pivot 14 rests against the plate 10 when the door is open and the end 15 of the lever is free of the wheel 8.

In closing the door, the end 15 of the lever 13 will strike the periphery of the wheel 8 and will turn the wheel until it passes nearly over the center of the wheel when it will occupy the position shown in the drawings. The holding force of the lever in its connection with the wheel can be varied by moving the plate 4 carrying the wheel 8 toward or from the lever 13 so that the end 15 of the lever will contact with the wheel near to or farther from the center of the wheel. In opening the door the wheel will be partially revolved by the end 15 of the lever in moving away from the wheel remaining in contact therewith until it has turned the wheel about a quarter of a revolution. The wheel will be turned in the reverse direction when the end 15 of the lever engaging it when the door is being closed.

This catch can be used in various places, for instance, on cupboards, closets, doors of various kinds and window blinds.

I claim as my invention.

1. A catch comprising two sections, one section composed of a support and an axially movable wheel, and the other section composed of a support and a lever pivotally connected to the support and held yieldingly in one position and adapted to directly engage the wheel and a stop to the movement of the lever in one direction.

2. A catch comprising two sections, one section composed of a support and an axially movable wheel, and the other section composed of a support, a lever pivotally connected to the support, a spring having one end connected to the support and its other end connected to the lever.

3. A catch comprising a movable wheel, a pivoted lever held yieldingly in one position and adapted to engage the movable wheel, and a stop to the movement of the lever in one direction.

SILAS C. SCHOFIELD.

Witnesses:
WM. PETERSEN,
A. O. BEHEL.